United States Patent [19]

Tyler

[11] Patent Number: 4,822,068
[45] Date of Patent: Apr. 18, 1989

[54] VEHICLE TOY

[76] Inventor: Vernal M. Tyler, 101 Fleet Dr., Port Ludlow, Wash. 98365

[21] Appl. No.: 164,581

[22] Filed: Mar. 7, 1988

[51] Int. Cl.⁴ .............................................. B62M 1/00
[52] U.S. Cl. ..................................... 280/211; 280/239
[58] Field of Search ............... 280/200, 211, 220, 221, 280/228, 239, 47.26, 3; 272/69, 70.3, 70.4, 114

[56] References Cited

U.S. PATENT DOCUMENTS

| | | | |
|---|---|---|---|
| 2,548,054 | 4/1951 | Pinto | 280/47.16 |
| 3,891,234 | 6/1975 | Auer et al. | 280/211 |
| 4,126,326 | 11/1978 | Phillips | 280/220 |

Primary Examiner—John A. Pekar
Attorney, Agent, or Firm—Gausewitz, Carr & Rothenberg

[57] ABSTRACT

The vehicle toy includes a split central roller with end rollers on either side of it, a platform between the segments of the split central roller, side members along the ends of the rollers, and vertical members leading to handrails above the rollers to be grasped by the person standing on the rollers to manipulate the vehicle. The central roller is positioned below the end rollers and the vehicle is symmetrical, allowing either end roller to be selectively engaged with the supporting surface, along with the central roller.

12 Claims, 3 Drawing Sheets

VEHICLE TOY

BACKGROUND OF THE INVENTION

A continuing need exists for a relatively large vehicle toy which will not only be enjoyable to operate and appeal to children of various ages, but also which will develop physical skills and coordination, as well as providing healthful exercise.

BRIEF DESCRIPTION OF THE INVENTION

The present invention fulfills the need indicated above. It provides a safe vehicle toy which can be operated by one or more children and manipulated to run forwards, backwards or to make turns. Some skill is required in manipulating the rollers of the vehicle, so that coordination is enhanced through use of the vehicle. It also provides healthful exercise of the legs, as well as the arms, of the operator.

The vehicle toy of the invention is a symmetrical assembly that includes a central roller and an end roller on either side of it. These rollers are positioned with their axles in parallelism. The central roller is split into two parts, and a stationary platform is between them. Side members extend along the opposite ends of the rollers and support the axles of the rollers. Vertical posts carried by the side rails lead to handrails that are horizontal and can be grasped by the person who stands on the vehicle.

Operation is accomplished by standing on the vehicle and operating the rollers with the feet. The central roller is positioned with its axle below the axles of the end rollers, so that, in operation, only one of the end rollers will engage the supporting surface. This may be selected by shifting the weight of the person or persons on the vehicle to cause it tilt to one end or the other. The vehicle may be turned by appropriate counter-rotation of the two segments of the central roller.

The resulting vehicle is rugged and of simple construction, which is readily producible. It allows for a variety of operations which are intriguing to the children operating it. The motion provided by manipulation of the rollers is rapid enough to be of interest to the operators, but not such as to create any hazard to their safety.

DETAILED DESCRIPTION OF THE INVENTION

Figure 1:
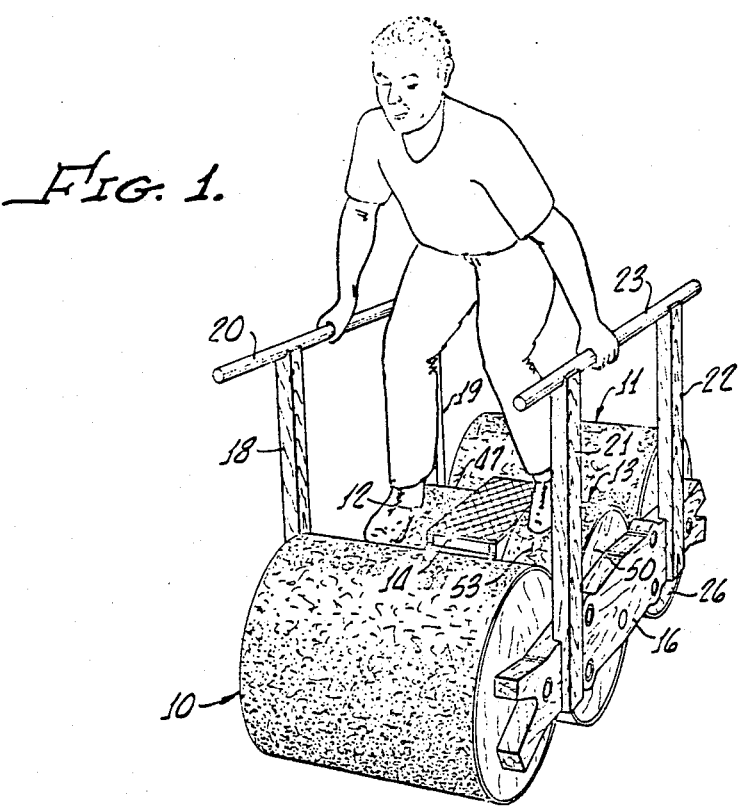
FIG. 1 is a perspective view of the vehicle toy of this invention.

As seen in FIG. 1, the device of this invention includes identical relatively wide front and rear rollers 10 and 11 with a central pair of rollers 12 and 13 between them. The rollers 12 and 13, which are axially aligned, are narrower than the rollers 10 and 11. The axes of the rollers 12 and 13 are parallel to and equally spaced from the axes of the rollers 10 10 and 11. The outer end of the roller 12 is in the same plane as one end of each of the end rollers 10 and 11. The outer end of the other central roller 13 similarly falls in the same plane as do the opposite ends of the rollers 10 and 11. All of the rollers are of the same diameter. Between the rollers 12 and 13 is a stable platform 14. On one side of the device, extending along one end of the rollers and 11 and the outside end of the roller 13, is a flat side rail 15. A similar rail 16 is on the opposite side of the unit on the outside of the roller 13 and the opposite ends of the rollers 10 and 11. Vertical supports 18 and 19 extend from the side rail 15 to a horizontal handrail 20 located above the rollers on one side of the unit. Corresponding vertical supports 21 and 22 extend from the side rail to a handrail 23 on the opposite side.

Figure 2:
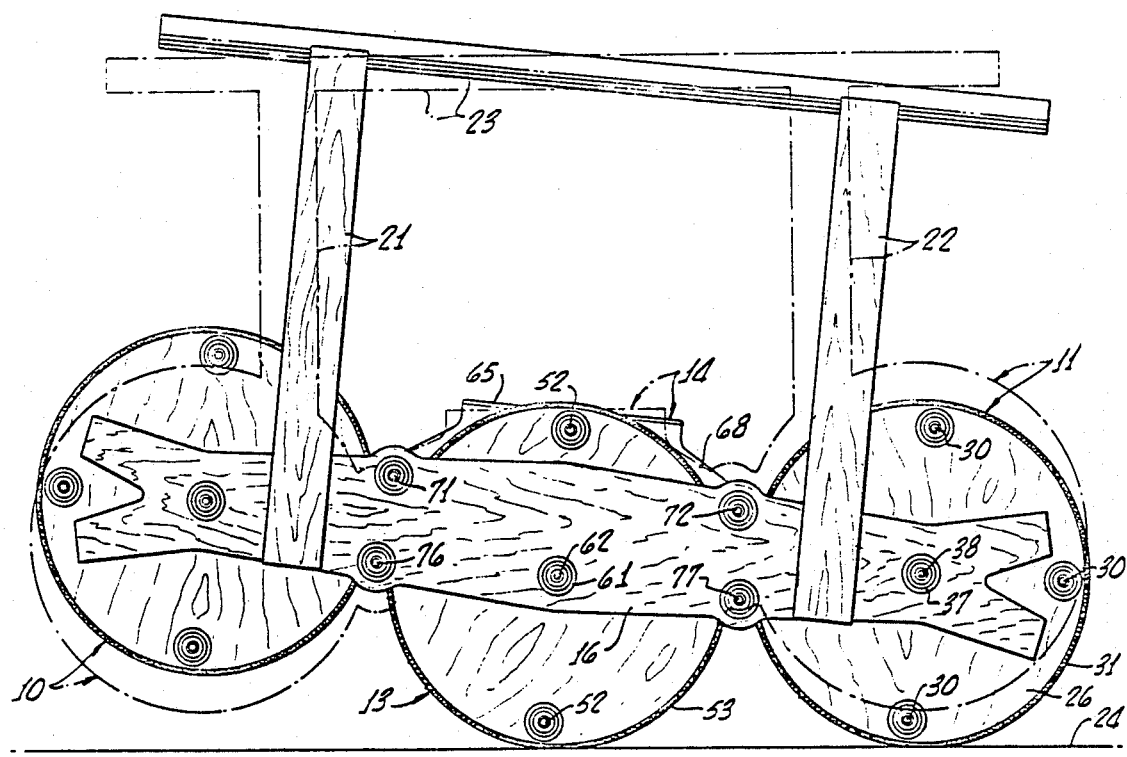
FIG. 2 is a side elevational view of the vehicle.
Figure 3:
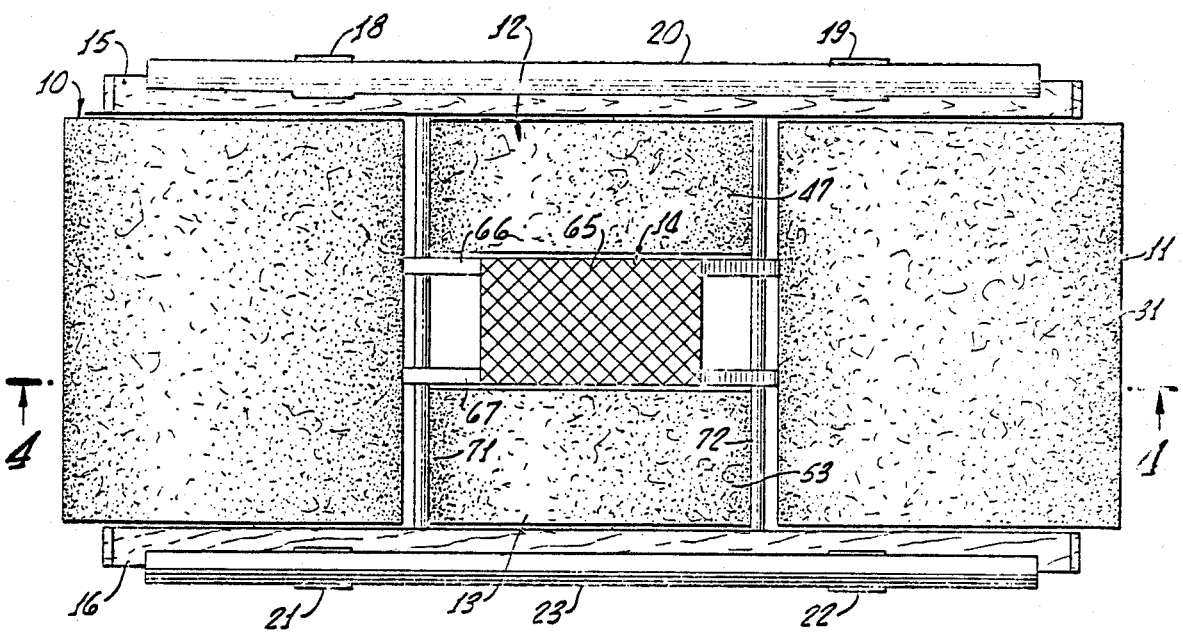
FIG. 3 is a top plan view of the vehicle.
Figure 4:
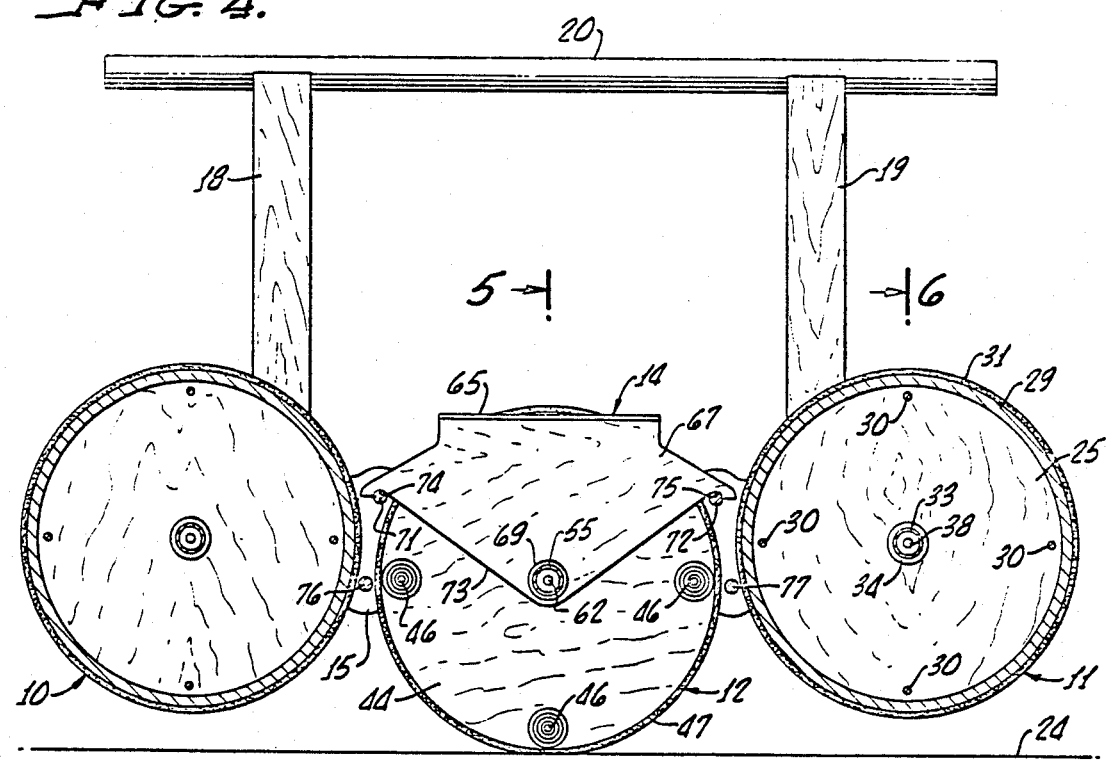
FIG. 4 is a longitudinal sectional view taken along line 4—4 of FIG. 3.

As seen in FIGS. 2 and 4, the central rollers 12 and 13 are lower than the end rollers 10 and 11. This means that the vehicle may tilt from one end to the other. For example, as shown in FIG. 2, the central rollers 12 and 13 engage the supporting surface 24, along with the rearward roller 11. The forward roller 10 then is elevated above the surface 24. Of course, the opposite effect may be accomplished by engagement of the forward roller 10, as well as the central rollers 12 and 13, leaving the rearward roller 11 elevated. The vehicle is symmetrical so that it can be tilted as easily toward one end as toward the other. The terms 'forward' and 'rearward', as used to identify the rollers, are only for convenience, because the two ends of the unit are identical.

In use of the device, the operator may stand on any of the rollers or combinations of rollers he selects, grasping one or both of the handrails 20 and 23. As shown in FIG. 1, the operator is standing on the rollers 12 and 13, and he may tilt the vehicle toward either end by shifting his weight. Manipulation of the feet will cause rotation of the rollers 12 and 13 to cause the vehicle to move. Differential rotation of the rollers 12 and 13 can cause the vehicle to turn, as can be accomplished, to some extent, also by rotation of one of the rollers 12 or 13 without turning the other. The operator may stand on and turn the roller 10 or the roller 11, or may actuate one of the end rollers in conjunction with one of the central rollers. The operator also may stand o the platform 14 on one foot and turn one of the rollers with the other. More than one person may stand on the vehicle at a time to help manipulate the rollers.

Figure 6:
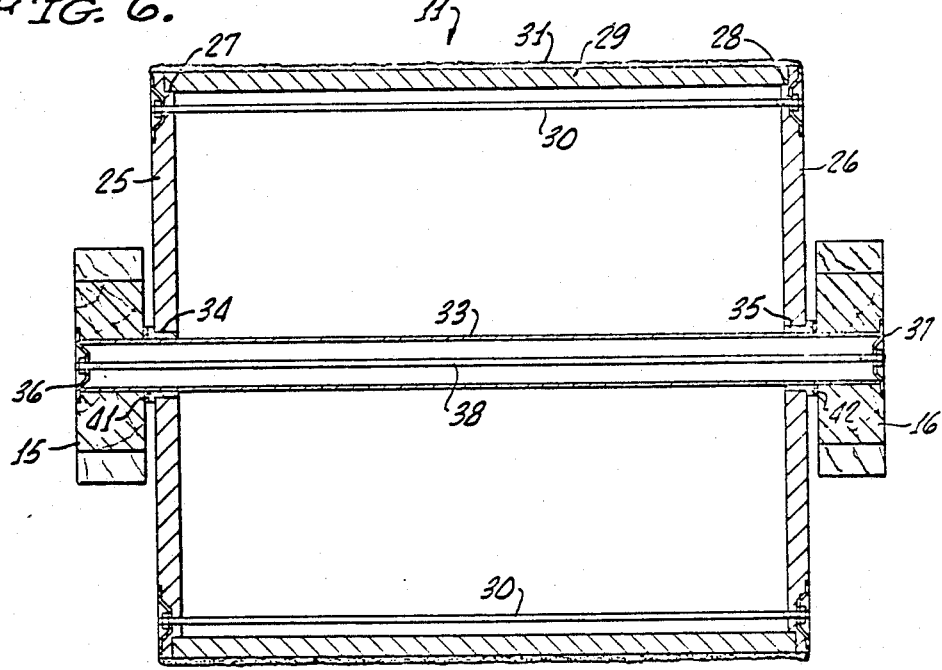

The end rollers 10 and 11 may be constructed as hollow drums, as shown in FIG. 6, which illustrates the roller 11. This includes radial end discs 25 and 26 which have shoulders 27 and 28 at their outer edges to receive and engage a circumferential member 29. Rods 30 extend through the end discs 25 and 26 and are threaded on their ends, which are engaged by nuts that hold the assembly together. A layer of carpeting 31 is applied over the circumferential member 29, providing a surface that has softness and facilitates the frictional drive of the roller by the feet of the operator of the vehicle.

At the axis of the roller, a tube 33 extends through the end discs 25 and 26 where it is received in bearings 34 and 35. The ends of the tube 33 are received within openings in the side rails and engage cup-shaped washers 36 and 37 that are recessed into the outer surfaces of the side rails 15 and 16, respectively. A rod 38 extends through the tube 33 and the washers 36 and 37. The ends of the rod 36 are threaded and are engaged by nuts, which bear against the washers 36 and 37 and thereby hold the side rails 15 and 16 to the roller and keep 10 the roller assembly together. Flat bearing washers 41 and 42 fit over the tube 33 between the side rails 15 and 16 and the bearings 34 and 35. With this construction, the roller 11 is permitted to rotate about the tube 33, which forms an axle.

Figure 5:
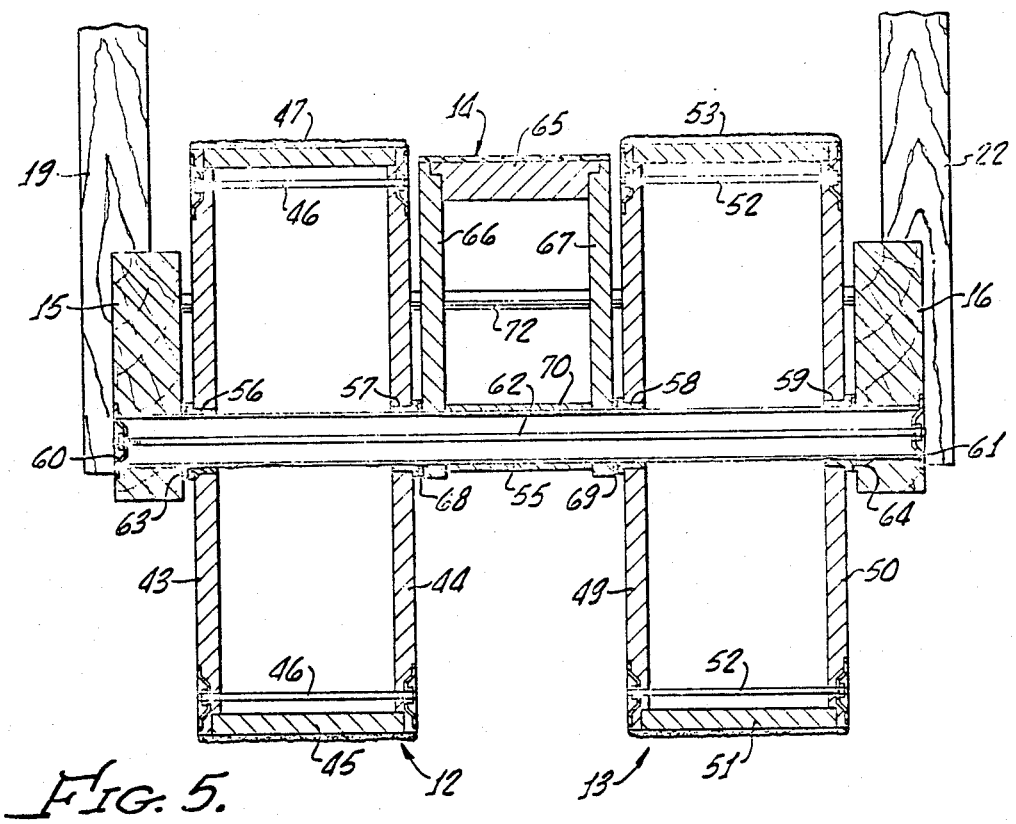
FIGS. 5 and 6 are transverse sectional views taken along lines 5—5 and 6—6 of FIG. 4, respectively.

The central rollers 12 and 13 are constructed similarly to the end rollers 10 and 11. As seen in FIG. 5, the roller 12 incorporates radial end discs 43 and 44 and a circumferential member 45, held together by rods 46 which are threaded at their ends and extend through the end discs 43 and 44. A layer of carpeting 47 extends around the peripheral circumference of the roller 12.

The roller 13 is constructed identically, with end discs 49 and 50, a circumferential element 51, and rods 52 to hold the assembly together Again, a layer of carpet 53 extends around the periphery.

At the axis of the rollers 12 and 13 is a tube 55 which extends through bearings 56 and 57 in the end discs 43 and 44 of the roller 12. The tube 55 also extends through bearings 58 and 59 in the end discs 49 and 50 of the roller 13. The ends of the tube 55 are received within openings in the side rails 15 and 16 and engage cup-shaped washers 60 and 61 carried by the side rails 15 and 16. The tube 55 is positioned in the side rails 15 and 16 below the axles of the rollers 10 and 11 to locate the central rollers 12 and 13 below the end rollers. A rod 62, threaded at its ends, extends through the tube 55, as well as the washers 60 and 61. Nuts on the ends of the rod 62 hold the assembly together. Flat bearing washers 63 and 64 receive the tube 55 and are positioned, respectively, between the side rail 15 and the bearing 56, and between the side rail 16 and the bearing 59.

The platform 14 includes a horizontal member 65 near the tops of the rollers 12 and 13, with vertical side plates 66 and 67 connected to it and extending downwardly, as well as tapering toward the front and rear. The side plates 66 and 67 receive the tube 55 adjacent their lower edges, which are convergent downwardly. Flat bearing washers 68 and 69 ar interposed between the side plates 66 and 67, and the bearings 57 and 58 of the central rollers 12 and 13, respectively (see Fig. 5). A short tube 70 fits closely over the tube 55 between the side plates 66 and 67, acting as a spacer.

The outer parts of the bottom edges of the side plates 66 and 67 are notched so as to receive and bear against rods 71 and 72. This may be seen in FIG. 4, where the bottom edge 73 of the side plate 67 has notches 74 and 75 at its opposite ends which receive the two rods 71 and 72. The latter elements extend through the side rails 15 and 16 of the vehicle, where they are held with nuts. Consequently, the rods 71 and 72, together with the tube 55, support the platform 14 and prevent its rotation.

An additional pair of rods 76 and 77 extends between the side members 15 and 16 beneath the rods 71 and 72 to assist in securely connecting the elements of the vehicle.

The foregoing detailed description is to be clearly understood as given by way of illustration and example only, the spirit and scope of this invention being limited solely by the appended claims.

What is claimed is:

1. A vehicle toy comprising
a duality of spaced end roller means,
a central roller means between said end roller means,
means for connecting said end roller means and central roller means together to form an assembly in which the lower part of said central roller means is lower than the lower parts of said end roller means and the axes of all of said roller means are parallel, whereby said central roller means will engage a supporting surface and either of said end roller means may be selectively and individually caused to engage said surface, and said vehicle may be caused to move by manipulation of said roller means, and
a handrail positioned generally above either end of said roller means of said assembly for providing a means to be grasped when manipulating said roller means.

2. A device as recited in claim 1 in which said central roller means includes a duality of rollers positioned in axial alignment.

3. A device as recited in claim 2 including, in addition, a platform intermediate said rollers of said central roller means.

4. A device as recited in claim 3 in which said means for connecting said central roller means to said end roller means comprises a duality of side members, one of said side members extending alongside the ends of said roller means on one side of said assembly and the other of said side members extending alongside the opposite ends of said roller means on the opposite side of said assembly, and axle means connecting side members and said roller means.

5. A device as recited in claim 1 in which said vehicle is symmetrical about said central roller means.

6. A device as recited in claim 5 in which said end roller means are identical in length and diameter, and in which the outer ends of said central roller means are aligned with the ends of said end roller means.

7. A device as recited in claim 6 in which all of said roller means are of the same diameter.

8. A vehicle toy comprising
a duality of spaced end roller means,
a central roller means between said end roller means,
means for connecting said end roller means and central roller means together to form an assembly in which the lower part of said central roller means is lower than the lower parts of said end roller means and the axes of all of said roller means are parallel, whereby said central roller means will engage a supporting surface and either of said end roller means may be selectively and individually caused to engage said surface, and said vehicle may be caused to move by manipulation of said roller means, said means for connecting said central roller means and said end roller means together comprising a duality of side members, one of said side members extending alongside the ends of said roller means on one side of said assembly and the other of said side members extending alongside the opposite ends of said roller means on the opposite side of said assembly, and axle means connecting side members and said roller means,
said central roller means including a duality of rollers positioned in axial alignment,
a platform intermediate said rollers of said central roller means, and connecting members extending between said side members inwardly of said end roller means, said platform including means for engaging said connecting members for preventing rotation of said platform.

9. A device as recited in claim 8 in which said platform includes a depending portion receiving and supported by said axle means.

10. A vehicle toy comprising a duality of identical end rollers positioned opposite each other with their axes parallel, a duality of axially aligned spaced central rollers intermediate said end rollers with their axes parallel to said axes of said end rollers, one end of each of said end rollers and one end of one of said central rollers falling substantially in the same plane, the opposite end of each of said end rollers and one end of the other of said central rollers falling substantially in the same plane, platform means between said central rollers, said platform means including a substantially horizontal surface at approximately the top edges of said central rollers, and a structure interconnecting said rollers and said platform, said structure being symmetrical about the centers of said central rollers, said structure including a member extending along said one end of each of said end rollers and said one end of said one central rollers, a member extending along said opposite end of each of said end rollers and said one end of said other central roller, an axle means connecting each of said end rollers to said members, an axle means connecting said central rollers to said members, said axle means for said central rollers being lower with respect to said members than said axle means for said end rollers, whereby said central rollers are adapted to engage a supporting surface along with only on of said end rollers, a vertical support extending upwardly from each of said members, and a handrail carried by each of said vertical supports.

11. A device as recited in claim 10 in which said structure includes a rod extending between said members on either side of said central rollers, and said platform means includes means for engaging said rods and said axle means for said central rollers, thereby to support said platform means.

12. A vehicle toy comprising a duality of spaced end rollers, a central roller means between said end rollers, said central roller means including a duality of spaced, axially aligned rollers, said end rollers being continuous, a platform intermediate said rollers of said central roller means and remote from said end rollers so that the full widths of said end rollers are exposed, and means for connecting said end rollers, said central roller means and said platform together to form an assembly in which the lower part of said central roller means is lower than the lower parts of said end roller means and the axes of all of said roller means are parallel, whereby said central roller means will engage a supporting surface and either of said end roller means may be selectively and individually caused to engage said surface, and said vehicle may be caused to move by manipulation of said rollers by the feet of an operator.

* * * * *